Nov. 24, 1936.　　　O. V. CLEARWATER　　　2,062,249
FOOD PACKAGE AND METHOD OF MAKING THE SAME
Filed April 12, 1934
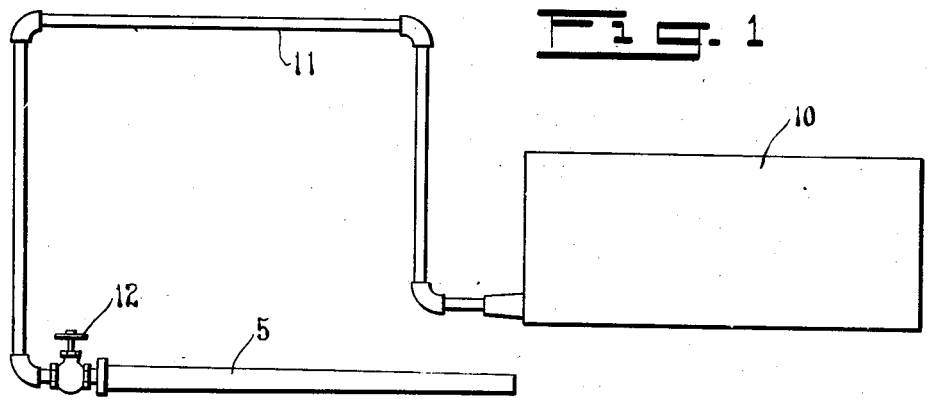
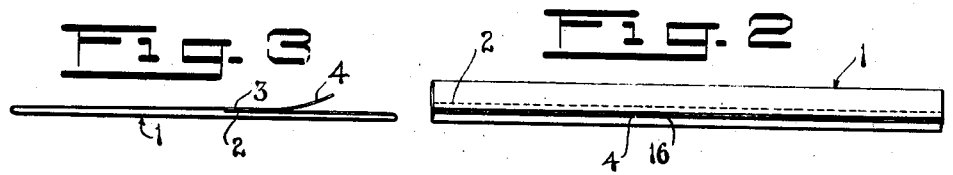
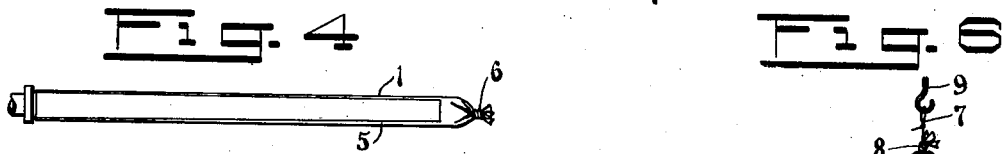
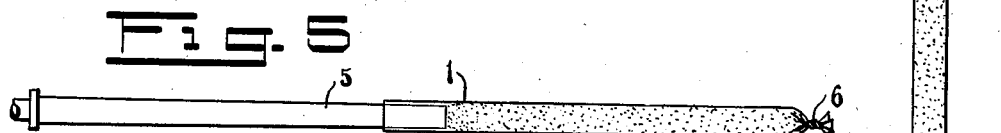
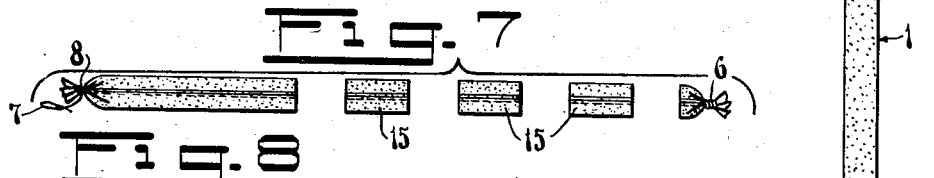
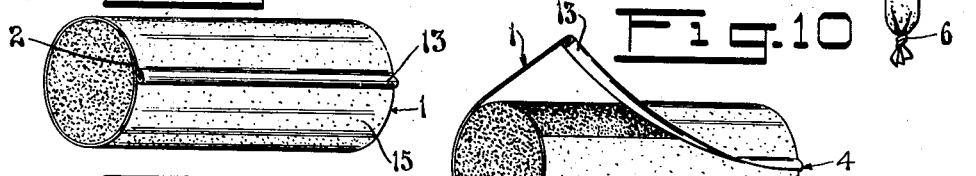
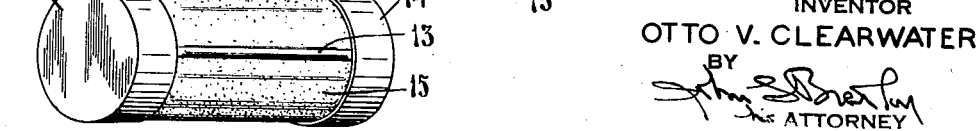
INVENTOR
OTTO V. CLEARWATER
BY
ATTORNEY Patented Nov. 24, 1936

2,062,249

UNITED STATES PATENT OFFICE 2,062,249

FOOD PACKAGE AND METHOD OF MAKING THE SAME

Otto Vade Clearwater, Hollis, N. Y., assignor, by mesne assignments, to The Girdler Corporation, Louisville, Ky., a corporation of Delaware Application April 12, 1934, Serial No. 720,180

7 Claims. (Cl. 99—180)

This invention relates to a novel, sanitary and attractive package of food which may be packed at the factory and which remains intact until the food is to be eaten. The invention also includes the method of making the package.

Although suitable for other foods the invention is particularly adapted for use in connection with the marketing and dispensing of ice cream, and for the sake of brevity the following description will be confined to an ice cream package and to the method of making it. It will be understood, however, that the invention is applicable to many other foods and is not limited to ice cream. Also, the term "ice cream" as used in this application includes all similar products irrespective of whether they conform to the technical definition of the term which, as is well known, varies in different localities and is largely determined by the butter fat content. Such products as sub-ice creams, sherbets, and water ices all come within the term as used herein.

Although quantities of ice cream are still sold in metal cans of several gallons capacity and dispensed therefrom by means of the familiar scoop, obviously, this practice leaves much to be desired from the point of view of convenience and sanitation. Furthermore, a great deal of ice cream is purchased in small quantities for home consumption. When it is supplied to the retail dealer in bulk it must be repacked in small containers, and the possibility of contamination from the repeated opening of the can, from unclean scoops and containers, or from contact with unclean hands is considerable.

Following the rapidly growing public consciousness of the importance of pure foods, and the desire for more convenient and attractive selling methods ice cream manufacturers have adopted the practice of packing their products for home consumption in small containers, such as pints and quarts, which may remain unopened until just before the ice cream is to be eaten. Ordinarily these are simply waterproofed pasteboard boxes of one shape or another, from which the purchaser must remove the ice cream with a spoon. Such containers are obviously impractical for service at soda fountains and ice cream parlors where the large metal container and scoop are still in common use, and even in the home the process of scooping out the ice cream is annoying and not conducive to attractive servings.

The package of this invention is of such a sort that it is useful both at the ice cream parlor and in the home. With its use the ice cream may be completely unwrapped with great ease without touching it with the hands, and then cut into smaller portions if desired, with neatness and dispatch. In addition, the wrapper may be made of transparent material, if desired, so that the condition and flavor of the ice cream is visible, a great convenience to the seller and a safeguard to the purchaser. To the ice cream manufacturer the package is of particular interest since it can be prepared with great economy and with a minimum of equipment, the use of special measuring and packing machines being unnecessary. A form of package of this invention and also the method of making it is illustrated in the drawing, of which Figure 1 is a diagrammatic illustration of a freezer and a connected device for forming the package of this invention;

Fig. 2 is a diagrammatic side view of the wrapper of the package in a collapsed condition;

Fig. 3 is an enlarged diagrammatic end view of the wrapper of Fig. 2;

Fig. 4 is a diagrammatic view of the wrapper of Fig. 2 positioned on the filling device;

Fig. 5 is a diagrammatic illustration of the filling device and wrapper when the wrapper has been almost completely filled;

Fig. 6 illustrates diagrammatically the filled wrapper during its sojourn in the hardening room;

Fig. 7 illustrates diagrammatically the formation of individual or larger units from the package of Fig. 6;

Fig. 8 is an enlarged view of one of the package sections of Fig. 7;

Fig. 9 is a similar view of the same package section provided with end closures; and Fig. 10 illustrates diagrammatically the manner in which the wrapper may be removed from the ice cream of the package of Fig. 8.

The package consists essentially of a food and a wrapper. The wrapper is tubular in form. It may be made of any desired flexible material, and either transparent or opaque.

The wrapper shown in Fig. 2 is a long tube, provided with a seam which may be opened, and with a flap for opening it. To form this wrapper the wrapping material is folded upon itself until the edges overlap as shown in Fig. 3. The under edge 2 is then securely attached to the overlying layer as shown at 3 by any suitable adhesive. This adhesive should be of such a character that while it will maintain the tube intact against any reasonable strain tending to cause the layers to slip one upon the other it will, nevertheless, permit one layer to be peeled from the other when it is desired to remove the wrapper. To assist in removal, the edge of the outer layer of the wrapper may be left free as shown in Fig. 3, to form a flap 4 which can be grasped by the fingers and peeled away from the under layer thus breaking the tube so that the wrapper may be removed from the ice cream or other food, without difficulty.

For this type of wrapper cellophane is an admirable material. It is transparent and although extremely thin possesses considerable strength. Its nature is such that two layers may be stuck together with sufficient strength to resist a very considerable strain tending to cause the surfaces to slip upon each other but may be easily peeled apart. It is also waterproof and very attractive in appearance. For these reasons cellophane is recommended as wrapper material, although any other suitable material may be employed. The tube, such as shown in Fig. 2, may be made of any convenient length, say 36 inches.

The following apparatus and method may be employed for filling the tubes. Tube 1 is slipped over a filler tube 5 as shown in Fig. 4 and the end of tube 1 adjacent the discharge end of filler tube 5 closed in any suitable way. For cellophane tubes it has been found that simply twisting the end as shown at 6 in Fig. 4 is sufficient. In the case of stiffer tubes some other closing means would be required such, for example, as one of the caps 14 (Fig. 9). The food, assumed to be ice cream, is then injected into tube 1 through filler tube 5, tube 1 being slowly withdrawn as it is filled, as shown in Fig. 5. When all but a small space at the end of tube 1 has been filled it is removed from filler tube 5, the open end closed and the filled tube placed in the hardening room where it remains until the ice cream is sufficiently hardened. A convenient method of closing this end of a flexible tube is to tie a string 7 around it as shown at 8 in Fig. 6. The string will also serve as a means of hanging the filled tube from a suitable support in the hardening room, such as hook 9. Stiffer tubes may be completely filled and stood on end in the hardening room with the top end open or closed.

Although filler tube 5 may be used in any desired way to fill tube 1, commercially it will be convenient as a general rule to connect it to the outlet of a standard constant discharge freezer such as that diagrammatically indicated at 10 by means of a pipe 11. With this simple arrangement ice cream of the semi-solid consistency delivered by the freezer will be forced through the pipe and the filler tube in a slow continuous stream. By including a valve 12 in the system the flow may be cut off or its rate regulated, as desired. For greater production several filler tubes may be connected into the pipe line 11 and operated concurrently up to the supply limit of the freezer and pipe line 11. When the ice cream in tube 1 is removed from the hardening room it may be sold in the long tubular form it then possesses, the ends being squared off and protected by caps if desired, leaving it to the dealer to cut it into sections 15 of the desired size, as shown in Fig. 7, or it may be cut at the plant into such sections equal to individual portions which may then be packed in boxes say of a dozen each, side by side, the exposed ends being protected by sheets of suitable paper or cardboard. For sections of larger size designed for home consumption it is suggested that the open ends should be closed by caps 14 as shown in Fig. 9 to form completely enclosed packages. Of course the smaller individual portions may be similarly closed if desired.

Returning now to the type of wrapper shown in Fig. 2, if the flap 4 is permitted to rest directly against the layer beneath after the tube is filled with ice cream, it may become frozen thereto or pressed down so that it is difficult to locate and lift. In order to improve this flap as an easily located and manipulated means for unwrapping the wrapper the flap may be rolled up into a tight spiral as shown at 13 in Fig. 8. This may be done before the tube is filled, if desired, but if one side of flap 4 is coated with a substance indicated at 16 having a materially different coefficient of contraction than the material itself then the spiral will be formed automatically through the different degree of contraction of the wrapper material and of the coating substance when subjected to the low temperature of the hardening room after which it will be maintained by the temperature of the ice cream.

Preferably, to form this spiral, the flap should curl under as shown in Figs. 8 and 10 instead of in the other direction since its edge will thus be protected against contact with anything tending to unroll it. This will be automatically accomplished if the substance with which the flap is coated has a lower coefficient of contraction than the wrapper material and is applied to the outer surface of the flap. Presumably the outside of the wrapper will carry a certain amount of decorative design and printing. In all probability if the ink used for the printing if applied to the flap it will provide the required coating to produce the desired curl. It sometimes happens that flap 13 does not form into a perfect spiral throughout the entire length of tube 1 but it will be found that when tube 1 is cut into sections as suggested a perfect spiral will be formed on each section.

When the ice cream contained within the package of Fig. 8 is to be eaten the wrapper may be removed simply by grasping the rolled edge 13 and peeling the wrapper from the ice cream as shown in Fig. 10. The same applies to the package of Fig. 9 but the caps must, of course, be removed before the wrapper is unrolled. Irrespective of whether caps are used it will be evident that the ice cream can be handled without contact with the hands and that the package is adapted for individual portions served in ice cream parlors quite as well as for those taken home by the purchaser. The labor and cost of packing is greatly reduced and simplified by filling a long tube of a capacity of several pints or quarts and then dividing it into sections of the desired size simply by cutting through both the wrapper and ice cream. In this way packages of various sizes can be made from tubes of the same diameter by simply varying the length of the sections into which they are cut.

I claim:

1. An ice cream package comprising a quantity of ice cream surrounded by a tubular wrapper composed of a sheet of wrapping material folded upon itself so that its opposite edges overlap, the under edge being fastened to the overlying surface and the upper edge being left free to form a flap, said flap being rolled into a relatively tight spiral.

2. An ice cream package comprising a body of ice cream surrounded by a tubular wrapper composed of a sheet of cellophane folded upon itself so that its opposite edges overlap, the under edge being peelably attached to the overlying surface, the upper edge being left free to form a flap whereby the upper surface may be peeled from the lower surface and from the ice cream body, said flap being formed into a relatively tight spiral.

3. A wrapper for ice cream consisting of a sheet of thin flexible wrapping material folded upon itself so that its opposite edges overlap, the under edge being peelably attached to the overlying surface, the upper edge being left free to form a flap whereby the upper surface may be peeled from the lower surface and from the ice cream body said flap being formed into a relatively tight spiral.

4. A wrapper for ice cream consisting of a sheet of thin flexible wrapping material formed into a tube by folding it upon itself so that its opposite edges overlap, the upper edge being left free to form a flap, said upper edge being coated on one side with a substance having a different coefficient of contraction than the wrapping material, whereby the flap will curl away from the juxtaposed wall of the wrapper and be readily graspable while at the approximate temperature of the ice cream.

5. A wrapper for ice cream consisting of a sheet of thin flexible wrapping material folded upon itself so that its opposite edges overlap, the under edge being peelably attached to the overlying surface, the upper edge being left free to form a flap whereby the upper surface may be peeled from the lower surface and from the ice cream body, said flap being formed into a relatively tight spiral, the exposed ends of said ice cream and the ends of said tubular wrapper and said spiral flap being closed by removable closures.

6. The method of making an ice cream package which consists of folding a sheet of thin flexible wrapping material upon itself so that its opposite edges overlap, peelably attaching the under edge to the overlying surface, the upper edge being left free to form a flap, coating one side of said flap with a substance having a different coefficient of contraction than that of the wrapping material, closing one end of said tube, sliding the tube onto a filling pipe, filling said tube with ice cream frozen to the consistency of a thickened liquid as the tube slides off the pipe, subjecting said filled tube to refrigeration until the ice cream is hardened and dividing said tube and said ice cream contained therein into sections.

7. A food package comprising a body of food surrounded by a tubular wrapper composed of a sheet of "Cellophane" folded upon itself so that its opposite edges overlap, the under edge being peelably attached to the overlying surface, the upper edge being left free to form a flap whereby the upper surface may be peeled from the lower surface and from the food body, said flap being formed into a relatively tight spiral.

OTTO VADE CLEARWATER.